United States Patent [19]
Phillips

[11] 4,300,931
[45] Nov. 17, 1981

[54] METHOD AND APPARATUS FOR COLLECTING FIBROUS MATERIAL

[75] Inventor: John D. Phillips, Newark, Ohio

[73] Assignee: Owens-Corning Fiberglas Corporation, Toledo, Ohio

[21] Appl. No.: 143,224

[22] Filed: Apr. 24, 1980

[51] Int. Cl.³ .............................................. C03B 37/04
[52] U.S. Cl. ............................................ 65/4.3; 65/6; 65/9; 65/14; 156/62.4
[58] Field of Search ............................ 65/4 R, 9, 5-7, 65/14-16, 4.4; 156/62.4

[56] References Cited
U.S. PATENT DOCUMENTS

| | | | |
|---|---|---|---|
| 3,026,563 | 3/1962 | Slayter et al. | 65/14 |
| 3,220,812 | 11/1965 | Underwood | 65/14 X |
| 3,326,650 | 6/1967 | Winn | 65/14 X |
| 3,746,524 | 7/1973 | Kircheim | 65/14 X |
| 3,787,194 | 1/1974 | Rayle et al. | 65/9 |
| 4,058,386 | 11/1977 | Faulkner et al. | 65/6 |
| 4,061,485 | 12/1977 | Rimmel | 65/4 R |

*Primary Examiner*—Robert L. Lindsay, Jr.
*Attorney, Agent, or Firm*—Ronald C. Hudgens; Philip R. Cloutier; Ted C. Gillespie

[57] ABSTRACT

A method and apparatus for collecting fibrous material in which a stream of fibrous material is directed towards a collection surface and a flow of gases is discharged substantially parallel to the stream and sufficiently close to the stream to expand the stream as it moves toward the collection surface.

10 Claims, 5 Drawing Figures

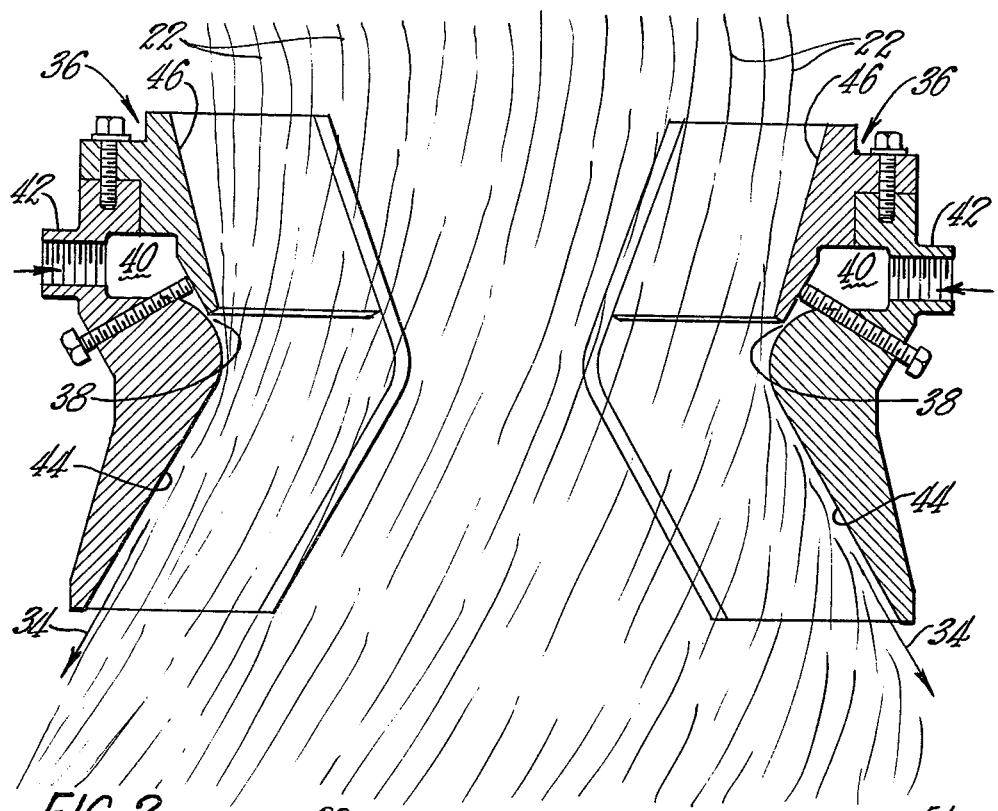
FIG. 2
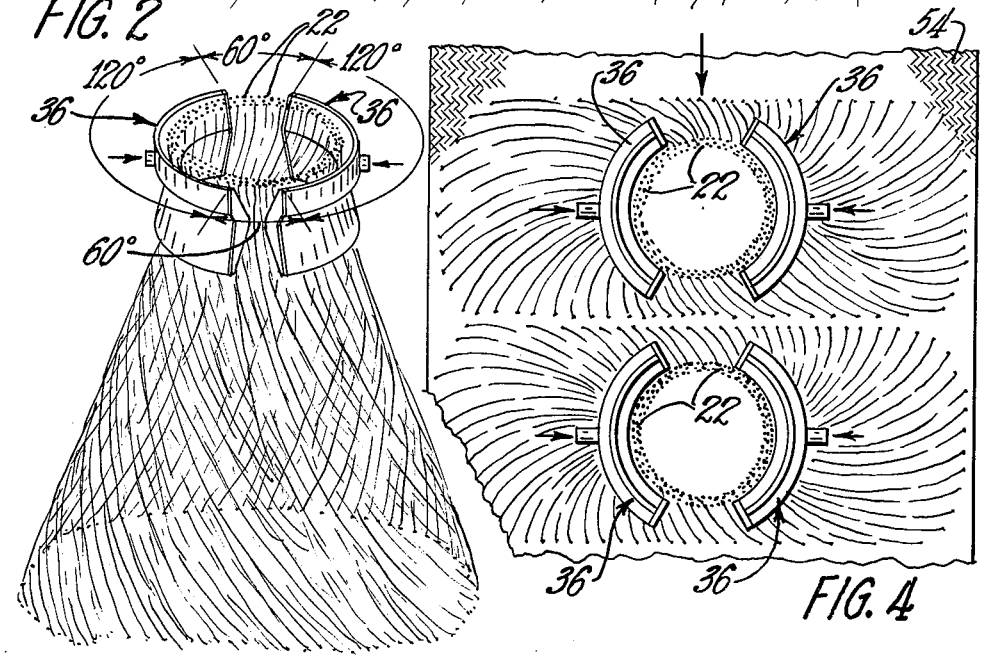
FIG. 3
FIG. 4

METHOD AND APPARATUS FOR COLLECTING FIBROUS MATERIAL

TECHNICAL FIELD

This invention relates to forming and collecting fibers from streams of fibrous material, such as fibrous mineral material, and collecting the fibrous material on a collection surface. In one of its more specific aspects, this invention relates to directing a stream of fibrous material toward a collection surface, and distributing the stream across the width of a collection conveyor.

BACKGROUND OF THE INVENTION

A common practice in collecting fibrous material is to direct the fibrous material as a stream or veil toward a collection surface, such as a foraminous conveyor, which receives the fibers and forms a mat or fibrous web thereon. For various reasons it is desirable to produce wider and wider mats or packs on the collection surface, particularly wider than the width of the stream of fibers. It is therefore desirable to distribute the fibers in order to cover the entire width of the collection surface. It is often the case that the collection conveyor has a width of up to six times or more of the width of the stream of fibrous material.

In order to evenly distribute the fibers from the stream across the entire width of the collection surface it is a common practice to lap the stream of fibers with an oscillating cylinder resembling an open-bottomed bucket. The oscillating bucket distributes the fibrous material rapidly from side to side of the collection surface, thereby providing relatively even distribution. Another method commonly utilized in distributing streams of fibrous material is directing the stream toward the center of the collection conveyor, and diverting some or all of the stream periodically to either one side or the other side of the conveyor with blasts of air. The air blasts are directed generally perpendicularly to the stream of fibrous material to impart a sideways distributive force thereto.

One of the problems with the above method for distributing streams of fibers is that they all consume significant amounts of energy. Also, the process of lapping the entire stream of fibers can cause nonuniformity as the fibers are laid down on the collection surface. The use of air blasts to distribute the stream of fibers causes problems because the fibers are accelerated toward the collection surface and have a tendency to bounce or blow back from the collection surface, thereby necessitating suction fans beneath the collection surface to hold the pack down onto the collection surface. The energy required to operate such suction fans is substantial, and all of the exhausted air must be treated for pollution control purposes. Excessive suction by the fans tends to crush some of the fibrous material in the pack. Also, the air blasts increase the general level of turbulence in the pack forming hood. The oscillating buckets lapper is limited to the production of relatively narrow fibrous packs, and is not suitable for use on wide machines. The method and apparatus of the invention are directed towards the solution of the above problems.

SUMMARY OF THE INVENTION

According to this invention there is provided a method for collecting fibrous material in which a stream of fibrous material is directed toward a collection surface, and further including discharging a flow of gases substantially parallel to the stream and sufficiently close to the stream to expand the stream as it moves toward the collection surface. The velocity of the fibrous material reaching the collection surface is reduced by the action of the flow of gases, thereby enabling a reduction in the suction requirements beneath the collection surface. Also, the amount of energy required to clean up the exhausted gases is reduced due to the lower volume of gases being exhausted. Since the fibers and associated gases reach the collection surface at a lower velocity, blow back and bouncing problems are substantially reduced. Also, the reduction in suction forces beneath the collection conveyor reduces the crushing of the bottom portion of the fibrous material in the pack.

In a specific embodiment of the invention, the flow of gases is discharged at a speed sufficiently greater than the speed of the stream of fibrous material to expand the stream as it moves toward the collection surface. The flow of gases can be discharged at a speed of up to about 10 times the speed of the stream of fibrous material. The speed or momentum of the flow of gases can be sufficient to generate a lower pressure outside the stream of fibrous material and to achieve a boundary layer acceleration resulting in diffusion of expansion of the stream.

In another embodiment of the invention, two flows of gases are discharged from two loci oppositely disposed about the stream of fibrous material.

In a preferred embodiment of the invention, a generally cylindrical veil of fibrous material is directed toward a collection conveyor and the veil is expanded to substantially cover the width of a collection conveyor.

In another preferred embodiment of the invention, two flows from two nozzles are discharged, each nozzle being disposed through an arc within the range from about 90 degrees to about 150 degrees of the circumference of the veil. Each nozzle can be disposed through an arc of about 120 degrees of the circumference of the veil.

According to this invention, there is also provided a method of collecting fibrous mineral material of the type in which a generally cylindrical veil of fibrous mineral material is directed generally downwardly toward a collection conveyor, the improvement comprising discharging generally downwardly two flows of gases substantially parallel to the veil and sufficiently close to the veil to expand the veil to substantially cover the width of the collection conveyor, the flows of gases being discharged from two nozzles oppositely disposed about the veil through arcs of about 120 degrees of the circumference of the veil.

According to this invention, there is also provided a method for collecting fibrous material of the type in which two or more streams of fibrous material are directed toward a collection surface, the improvement comprising discharging flow of gases substantially parallel to the streams and sufficiently close to the streams to expand the streams as they move toward the collection surface, and further controlling the distribution of the fibrous material on the collection surface by controlling the expansion of the individual streams of fibrous material.

According to this invention, there is also provided apparatus for collecting fibrous mineral material of the type in which a generally cylindrical veil of fibrous mineral material is directed toward a collection surface, the improvement comprising two nozzles oppositely disposed about the veil, each nozzle discharging a flow of gases substantially parallel to the veil, each nozzle being positioned sufficiently close to the veil to cause the stream to expand as it moves towards the collection surface, and each nozzle being adapted to discharge the flow through an arc within the range of from about 90 degrees to about 150 degrees of the circumference of the veil. Each nozzle can be adapted to discharge its flow through an arc of about 120 degrees of the circumference of the veil.

In one embodiment of the invention, the nozzles are adapted to discharge the flows at speeds of about ten times the speed of the veil.

In a preferred embodiment of the invention, each nozzle is adapted at its downstream side with a diverging surface.

In a most preferred embodiment of the invention, each of the nozzles is adapted at its upstream side with a converging surface.

DESCRIPTION OF THE DRAWINGS

FIG. 2 is a schematic view of a veil of fibrous material being expanded by flows of gases from nozzles according to the principles of this invention.

FIG. 3 is a perspective view of a veil of fibrous material being expanded by two nozzles according to the principles of this invention.

FIG. 4 is a schematic plan view of a system for distributing and collecting fibers from a plurality of veils according to the principles of this invention.

DESCRIPTION OF THE INVENTION

For purposes of illustration, the principles of the invention will be described in the context of a glass fiber forming and collecting operation. It is to be understood that the invention includes uses with other mineral fibers and with other fibrous materials, and with alternative fiber forming methods.

Figure 1:
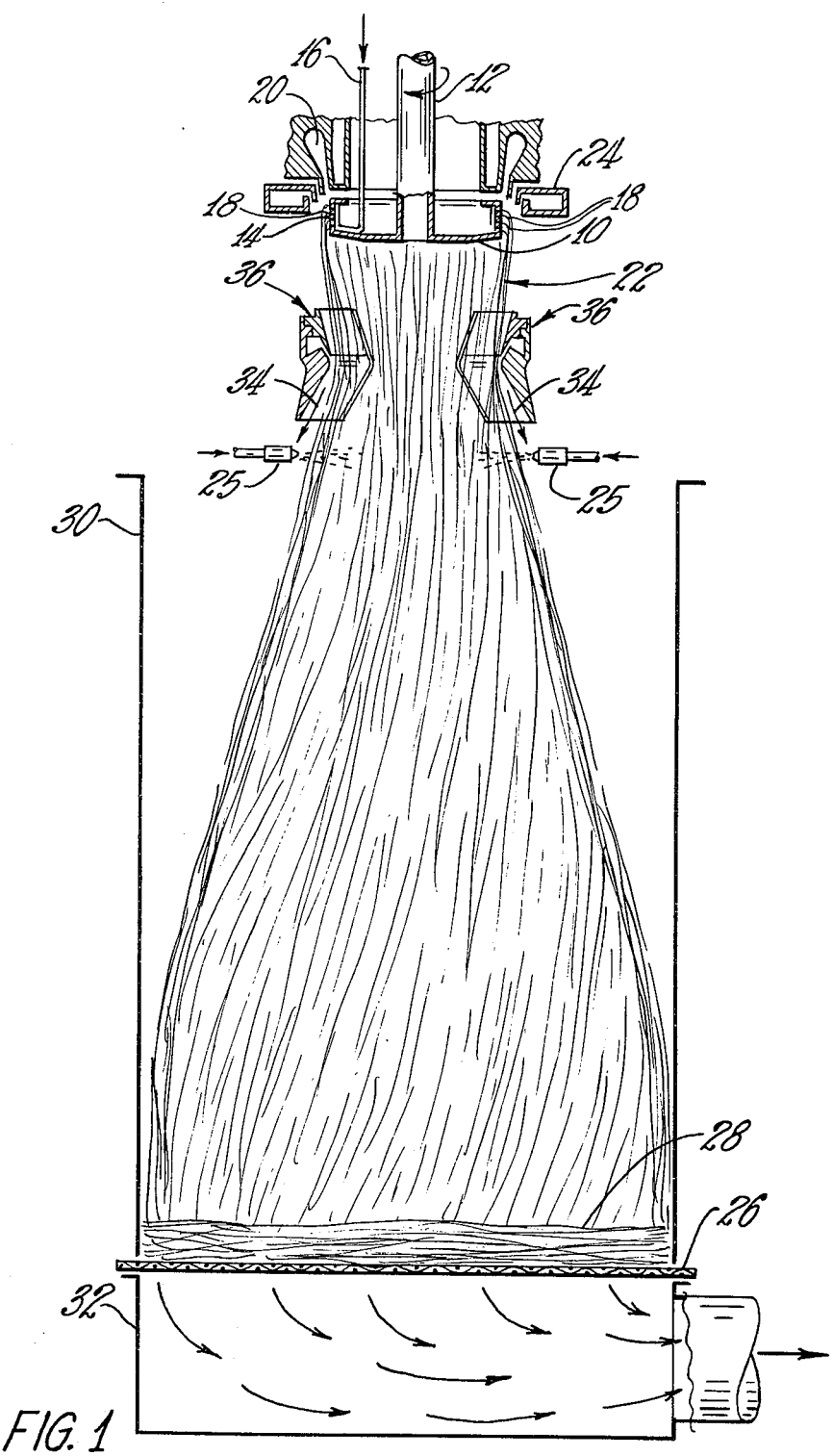
FIG. 1 is a schematic view in elevation of the apparatus for collecting fibrous material according to the principles of this invention.

As shown in FIG. 1, spinner 10 can be mounted for rotation on quill 12 and can have orificed peripherial wall 14. Molten glass stream 16 can drop into the bottom of the spinner and flow outwardly and upwardly to the spinner peripheral wall through which the glass passes as fibers 18. The fibers can be maintained in an attenuable state by the heat from annular burner chamber 20, and the fibers can be turned down into a stream or veil 22 of fibrous glass by the action of annular blower 24. Binder can be applied to the fibers in the stream of fibrous material by any suitable means, such as binder nozzles 25. The veil is directed toward collection surface 26, upon which the fibers collect as mat or pack 28. The fiber distribution and collection process occurs generally within forming hood 30, which defines the width of the collection surface and of the pack. Suction means, not shown, create a partial vacuum in plenum area 32 beneath the collection surface in order to hold the fibrous material down onto the collection surface.

Means, such as nozzles 36, for discharging flows 34 of gases substantially parallel to the veil are positioned sufficiently close to the veil to expand the veil as it moves toward the collection surface. In order for the flow of gases discharged from the nozzle to expand the veil, the veil must come within the influence of the flow of gases. As shown in FIG. 2, the nozzles can comprise downwardly directed slot 38 supplied by manifold 40 which can in turn be supplied from a source of air, not shown, via conduit 42. The nozzle can be adapted at its downstream side with a diverging surface, such as diffuser flap 44. The surface of the diffuser flap can be a Coanda surface to facilitate the divergence of the flow of gases and the expansion of the veil. As the flow of gases moves downwardly from the nozzle slot, it pulls or diverts a portion of the veil outwardly from the center of the veil, thereby causing the veil to expand and to decelerate. In the preferred embodiment, the diffuser flap is at an angle of approximately 30 degrees from the center line of the veil. Each nozzle can also be adapted at its upstream side with a converging surface such as inlet control surface 46, which in the preferred embodiment is at an angle of approximately 15 degrees from the centerline of the veil. The inlet control surface enables the nozzles to be placed sufficiently close to the veil for proper divergence without having some of the veil flow behind the nozzle.

The flow of gases discharged from the nozzle is usually introduced at a speed higher than the speed of the veil. The nozzle can be adapted, for example, with a slightly subsonic design, enabling a discharge velocity of the flow of gases of approximately 300 meters per second. As the veil passes the nozzles, its speed is approximately 30 meters per second and therefore the speed of the flow of gases is about 10 times the speed of the veil.

As shown in FIG. 3, the apparatus can be adapted with two nozzles, with each nozzle adapted to discharge its flow through an arc within the range of from about 90 degrees to about 150 degrees of the circumference of the veil. Preferably, each nozzle will cover an arc of approximately 120 degrees.

The system of fiber distributing and collecting shown in FIG. 4 includes paired nozzles expanding a plurality of veils of fibers prior to their deposition on the collection conveyor. It can be seen that the invention can be applied to a system containing any number of veils.

Figure 5:
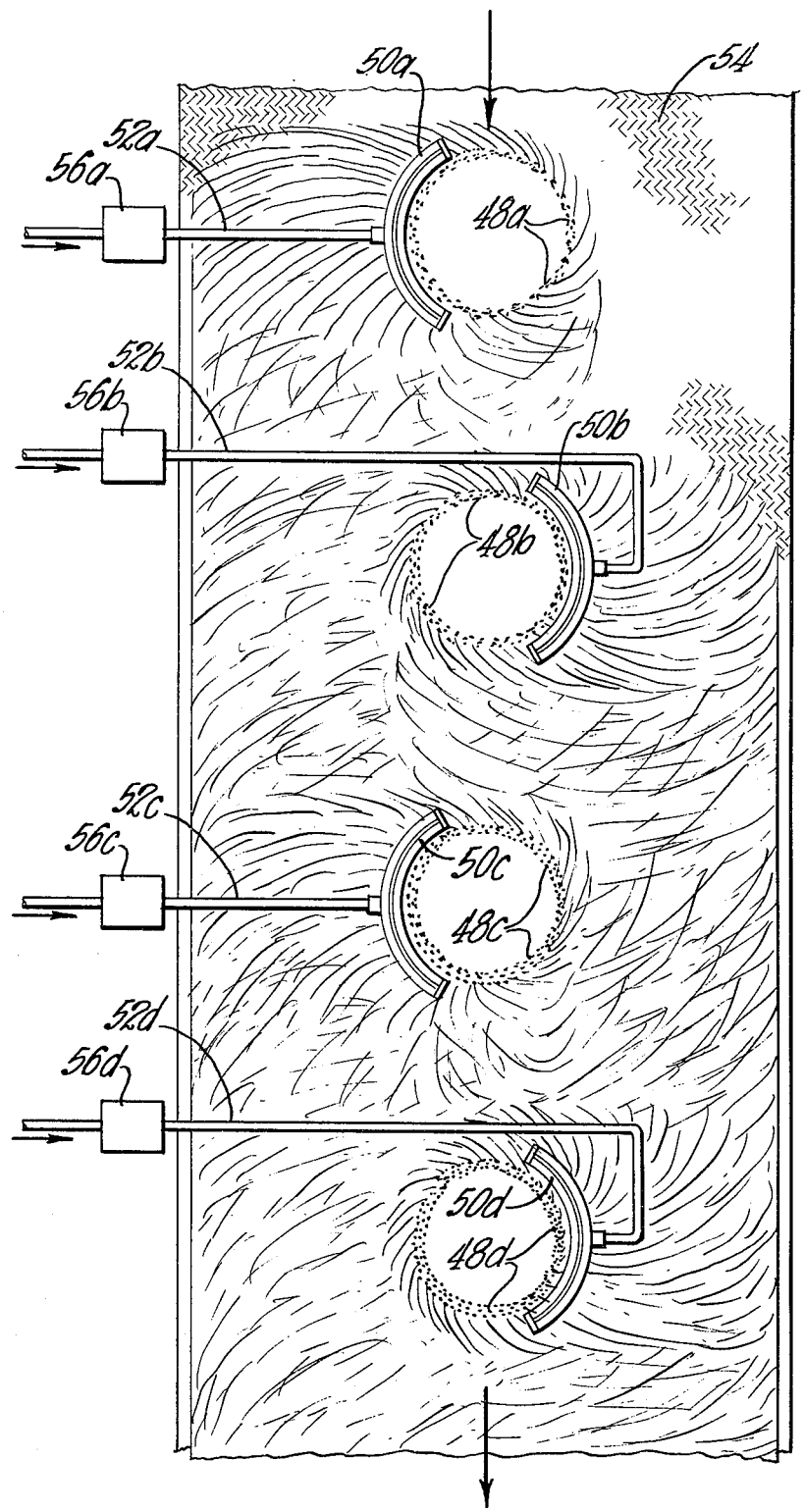
FIG. 5 is a schematic plan view of a system for collecting fibrous material from several streams of fibrous material according to the principles of this invention.

The system of fiber distributing and collecting, as shown in FIG. 5, can include, for example, four veils 48A, 48B, 48C, and 48D. Each veil can have associated with it nozzles 50A, 50B, 50C, and 50D and the associated supply conduits 52A, 52B, 52C and 52D. Since there is only one nozzle for each veil, the operation of the nozzles diverts and expands each veil toward one side or the other of the collection surface on which is formed pack 54. The flow of air into each of the nozzles can be controlled by control means 56A, 56B, 56C, and 56D. The control means can be any suitable means, such as solenoid valves, for controlling the flow of air into the nozzles. By controlling the air flow into each of the nozzles, the expansion of each veil and the distribution of the fibers from each veil, can be controlled. Thus, for example, should the right hand edge of the pack being collected on the collection surface as shown in FIG. 5 be of lower density than desired, then operation of control means 56B could be modified to increase the flow of air discharged from nozzle 50B and to divert more of veil 48B toward the right hand side of the collection surface. Each of the control means can be coordinated by means not shown to effectively control the distribution of fibers on the collection surface. The operation of the control means can be in response to sensing means, not shown, for determining deviations from desired fiber distribution patterns.

EXPLOITATION IN INDUSTRY

This invention will be found to be useful in the formation of fibers from molten glass for such uses as glass fiber thermal insulation products and glass fiber acoustical insulation products.

I claim:

1. In a method for collecting fibrous mineral material of the type in which molten mineral material is supplied to a rotating spinner, the molten mineral material is discharged from the orificed peripheral wall of said spinner as mineral fibers, the mineral fibers are turned down into a downwardly moving veil, and the fibers are collected on a collection surface positioned beneath said spinner, the improvement comprising positioning a gas discharge nozzle beneath said spinner, said discharge nozzle comprising a downwardly converging inlet surface, a downwardly diverging outlet surface, and a gas discharge slot intermediate said inlet surface and said outlet surface, and discharging a flow of gases from said gas discharge slot substantially parallel to said veil to expand said veil to the width of said collection surface.

2. The method of claim 1 comprising discharging said flow at a speed of about ten times the speed of said veil.

3. The method of claim 1 comprising discharging two flows of gases from two loci oppositely disposed about said veil.

4. The method of claim 3 comprising discharging said two flows from two nozzles, each nozzle being disposed through an arc within the range of from about 90 degrees to about 150 degrees of the circumference of said veil.

5. The method of claim 4 comprising discharging said two flows from two nozzles, each nozzle being disposed through an arc of about 120 degrees of the circumference of said veil.

6. In a method for collecting fibrous mineral material of the type in which molten mineral material is supplied to rotating spinners, the molten mineral material is discharged from the orificed peripheral wall of said spinners as mineral fibers, the mineral fibers are turned down into downwardly moving veils, and the fibers are collected on a collection surface positioned beneath said spinners, the improvement comprising positioning gas discharge nozzles beneath said spinners, said discharge nozzles comprising downwardly converging inlet surfaces, downwardly diverging outlet surfaces, and gas discharge slots intermediate said inlet surfaces and said outlet surfaces, discharging flows of gases from said gas discharge slots substantially parallel to said veil to expand said veil to the width of said collection surface, and controlling the distribution of the fibrous material on the collection surface by controlling the expansion of the individual veils of fibers.

7. Apparatus for collecting fibrous mineral material of the type in which molten mineral material is supplied to a spinner, the molten mineral material is discharged from the orificed peripheral wall of said spinner as mineral fibers, the fibers are turned down into a downwardly moving veil, and the fibers are collected on a collection surface positioned beneath said spinner, the improvement comprising a gas discharge means positioned beneath said spinner, said gas discharge means having a downwardly converging inlet surface, a downwardly diverging outlet surface and a downwardly directed gas discharge slot intermediate said inlet surface and said outlet surface for discharging a flow of gases substantially parallel to said veil to expand said veil to the width of said collection surface.

8. The apparatus of claim 7 in which said gas discharge means comprises two nozzles oppositely disposed about the veil, each nozzle discharging a flow of gases substantially parallel to said veil, each nozzle being positioned sufficiently close to said veil to cause said stream to expand as it moves toward the collection surface, and each nozzle being adapted to discharge said flow through an arc within the range from about 90 degrees to about 150 degrees of the circumference of said veil.

9. The apparatus of claim 8 in which each nozzle is adapted to discharge said flow through an arc of about 120 degrees of the circumference of said veil.

10. The apparatus of claim 9 in which said nozzles are adapted to discharge said flows at speeds of about ten times the speed of said veil.

* * * * *